(12) United States Patent
Reeves et al.

(10) Patent No.: US 7,088,717 B2
(45) Date of Patent: Aug. 8, 2006

(54) SYSTEM AND METHOD OF OPERATING A COMMUNICATION NETWORK ASSOCIATED WITH AN MPLS IMPLEMENTATION OF AN ATM PLATFORM

(75) Inventors: Mike Reeves, Ottawa (CA); Nutan Behki, Nepean (CA); David Toscano, Nepean (CA); Ken Dubuc, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 833 days.

(21) Appl. No.: 09/977,960

(22) Filed: Oct. 17, 2001

(65) Prior Publication Data
US 2002/0071439 A1 Jun. 13, 2002

(30) Foreign Application Priority Data
Dec. 8, 2000 (CA) .................... 2327918

(51) Int. Cl.
*H04L 12/56* (2006.01)
(52) U.S. Cl. .................... 370/392; 370/401; 370/466
(58) Field of Classification Search ........... 370/352, 370/354, 392, 395.1, 395.52, 400, 401, 474, 370/476
See application file for complete search history.

(56) References Cited

U.S. PATENT DOCUMENTS

| | | | |
|---|---|---|---|
| 6,055,561 A * | 4/2000 | Feldman et al. ............ 709/200 |
| 6,343,083 B1 * | 1/2002 | Mendelson et al. ......... 370/446 |
| 6,628,617 B1 * | 9/2003 | Karol et al. ................. 370/237 |
| 6,697,329 B1 * | 2/2004 | McAllister et al. .......... 370/235 |
| 6,778,494 B1 * | 8/2004 | Mauger ....................... 370/230 |
| 6,882,643 B1 * | 4/2005 | Mauger et al. .............. 370/389 |
| 2002/0097463 A1 * | 7/2002 | Saunders et al. ............ 359/124 |
| 2002/0176370 A1 * | 11/2002 | Ohba et al. ................. 370/252 |
| 2005/0083936 A1 * | 4/2005 | Ma .............................. 370/392 |

OTHER PUBLICATIONS

David B. Johnson et al.: "The Dynamic Source Routing Protocol for Mobile Ad Hoc Networks", Nov. 17, 2000, IETF XP002231891, http://www.ietf.org/proceedings/00dec/I-D/draft-ietf-manet-dsr-04.txt.

Francois Le Faucheur: "IETF Multiprotocol Label Switching (MPLS) Architecture", IEEE International Conference on ATM, XX, XX, Jun. 22, 1998, XP002115225.

(Continued)

*Primary Examiner*—Chau Nguyen
*Assistant Examiner*—Rhonda Murphy
(74) *Attorney, Agent, or Firm*—Marks & Clerk; Richard J. Mitchell

(57) ABSTRACT

A system and method of operating a communications network having a plurality of interconnected nodes is provided by: establishing a connection path from an ingress node to an egress node through intermediate nodes; associating the connection path with a network-wide unique identification; on the ingress node, storing the path identification so as to indicate that the path originates at the ingress node; on each intermediate node, storing the path identification so as to indicate that the path transits the intermediate node; and on the egress node, storing the path identification so as to indicate that the path terminates at the ingress node.

13 Claims, 11 Drawing Sheets

OTHER PUBLICATIONS

Goran Hagard et al.: "Multiprotocol Label Switching in ATM Networks", 1998, Ericcson Review No. 1 XP0022331892, http://www.ericsson.com/about/publications/review/1998_01/files/1998015.pdf.

E.C. Rosen et al.: "Multiprotocol Label Switching Architecture", IETF, Aug. 1999, XP002195011.

Loa Andersson et al.: "LDP Specification", Aug. 2000, IETP XP002231893, http://www.ietf.org/proceedings/00dec/I-D/draft-ietf-mpls-ldp-11.txt.

Bruce Davie et al.: "MPLS Using LDP and ATM VC Switching", Jun. 2000, IETF XP002231894, http://www.ietf.org/proceedings/00dec/I-D/draft-ietf-mpls-atm-04.txt.

* cited by examiner

Fig. 4

| Parameter | Description | Default | NMTI | SNMP | NCI | CLI |
|---|---|---|---|---|---|---|
| ID number | A identification number assigned for this SI; unique within a subslot. This value is internally assigned and cannot be changed. This is 5 digit number field. | None | R | - | - | - |
| Endpoint | The ATM endpoint (shelf-slot-subslot-port; VPI/VCI) used by the SI. | None | R/W | - | - | - |
| Name | Name of the SI. This is 16 character text string field | Empty | R/W | - | - | - |
| Application | Application(s) provided by this SI. This is a boolean vector (i.e. bit map) indicating whether each of forwarding, routing and LDP is enabled. | Forward | R/W | - | - | - |
| Address type | Type of the IP address field. Valid type supported are unnumbered and IPv4. | Un-numbered | R/W | - | - | - |
| IP address | The IP address of the service interface. Represented to the user in standard "dotted decimal" format. "Illegal" IP addresses (e.g. 0.0.0.0, 255.255.255.255) are blocked. | Un-assigned | R/W | - | - | - |
| IP address prefix length | Number of bits in the IP address which constitute the (sub)network ID. A number in the range of 0..32. | None | R/W | - | - | - |
| Neighbour address type | Type of the neighbour IP address field. Valid type supported are unnumbered and IPv4. | Un-numbered | R/W | - | - | - |
| Neighbour IP address | The IP address used at the termination of the SI at the neighbouring router. Represented to the user in standard "dotted decimal" format. "Illegal" IP addresses (e.g. 0.0.0.0, 255.255.255.255) are blocked. | Un-assigned | R/W | - | - | - |
| Encapsulation | Encapsulation used on the SI. (RFC1483 LLC/SNAP routed IP, RFC1483 NULL) | RFC1483 NULL | R/W | - | - | - |
| MTU | Maximum Transmission Unit. | 2016 octets | R | - | - | - |
| Ingress traffic contracts | An ingress traffic contract structure consists of an action (disable, tag, discard), a committed information rate (in b/s) and a burst size (in bytes). Eight ingress traffic contract structures are contained in each SI; each applies to a CoS. | disable CIR 0 BS 0 | R/W | - | - | - |
| Status | Status of the service interface. (Up, Down). | Down | R | - | - | - |

Service Interface Parameters

SYSTEM AND METHOD OF OPERATING A COMMUNICATION NETWORK ASSOCIATED WITH AN MPLS IMPLEMENTATION OF AN ATM PLATFORM

FIELD OF ART

The invention relates to the art of digital communication systems and more specifically to an implementation of a network employing multi-protocol label switching (MPLS) over an asynchronous transfer mode (ATM) platform.

BACKGROUND OF INVENTION

MPLS is quickly gaining support in the industry as a robust way of transmitting Internet Protocol (IP) packets. This is primarily because MPLS eliminates the need to examine the destination IP address of a packet at every router or network node in the path of the packet. As such, MPLS has particular utility in the high speed core of many networks. Recognizing that within the high speed core ATM switching infrastructure is likely to exist, the industry is presently in the process of formulating standards for deploying MPLS over an ATM infrastructure.

As in the nature of most standardization efforts, the focus has been to define the functional features necessary to enable interoperability amongst equipment manufactured by a variety of participants. However, many problems arise in implementing MPLS functionality. These include: (1) the general management and maintenance of signalled label switched paths (SLSP) on an ATM infrastructure; (2) procedures on the failed establishment of an SLSP; (3) management of signalling links; (4) procedures when a signalling link or physical link fails; and (5) procedures under various changes in network topology, such as the creation of a new signalling link. The present invention seeks to provide solutions to these various issues.

SUMMARY OF INVENTION

One aspect of the invention relates to a method of transmitting packets received from a connectionless network, such as an IP network wherein each packet includes a destination network address, over a connection-orientated network, such as an ATM network. According to the method a forwarding table is provided wherein each network address is associated with a single interface index which dictates an output port and a connection over which corresponding packets should transported. Connectionless packets are forwarded to an output port based on an interface index obtained from the forwarding table. The connectionless packets are thus transmitted over the corresponding connection. A routing table is maintained in order to route connectionless packets over a connection-oriented network. The routing table associates each network address with one or more interface indexes. Each interface index is also associated with an application, one application being connectionless routing and one application being label switching. Interface indexes are downloaded from the routing table to corresponding entries in the forwarding table such that the label switching application has a higher priority than the connectionless routing application.

In a second aspect, a method of operating a communications network having interconnected nodes is provided. The method comprises establishing a connection path from an ingress node to an egress node through intermediate nodes, associating the connection path with a network-wide unique identification, on the ingress node, storing the path identification so as to indicate that the path originates at the ingress node, on each the intermediate node, storing the path identification so as to indicate that the path transits the intermediate node and on the egress node, storing the path identification so as to indicate that the path terminates at the ingress node.

The method may have the step of establishing a connection path including signalling a connection set-up request from the ingress node through the intermediate nodes to the egress node. Further, the step of establishing a connection path may include an acknowledgement from the egress node through the intermediate nodes to the ingress node in response to the connection set-up request.

In a third aspect, the invention provides a method of transmitting packets received from a connectionless network. Each packet includes a destination network address. The method provides a forwarding table wherein each network address is associated with a single interface index which dictates an output port and a connection over which corresponding packets should transported, forwards a connectionless packet to an output port based on an interface index obtained from the forwarding table and transmits the connectionless packet over the corresponding connection, maintains a routing table for routing connectionless packets over a connection-oriented network, the routing table associating each network address with one or more interface indexes, associates each interface index with an application, one application being connectionless routing and one application being label switching and downloads interface indexes from the routing table to corresponding entries in the forwarding table such that the label switching application has a higher priority than the connectionless routing application.

In a fourth aspect, the invention provides a method of transmitting packets. The method includes receiving (a) connection-oriented packets having a label associated therewith, the label being a connection identifier, and (b) connectionless packets carrying a network address and having no label associated therewith, providing a forwarding table wherein each network address is associated with a single interface index which dictates an output port and a connection over which corresponding connectionless packets should transported, providing a switching table for switching ingress labels into egress labels, forwarding a connectionless packet to an output port based on an interface index obtained from the forwarding table, forwarding a connection-oriented packet to an output port based on the switching table, transmitting connection-oriented and connectionless packets over the corresponding connections, maintaining a routing table for routing connectionless packets over a connection-oriented network, the routing table associating each network address with one or more interface indexes, associating each interface index with an application, one application being connectionless routing and one application being label switching and downloading interface indexes from the routing table to corresponding entries in the forwarding table such that the label switching application has a higher priority than the connectionless routing application.

In a fifth aspect, the invention provides a network node. The node comprises input and output ports operative to receive and transmit packets carrying a connection identifier for transport over a connection-oriented network, switching logic for switching the connection-oriented packets from one of the input ports to one of the output ports based on one of the connection identifiers, segmentation and re-assembly logic for enabling the ports to assemble connectionless packets from the payloads of one or more connection-oriented packets on ingress and to segment each such connectionless packet into one or more connection-oriented packets on egress, each the message packet carrying a network address for transport over a connectionless network, forwarding logic for forwarding connectionless packets from one of the input ports to one of the output ports, the forwarding logic including a forwarding table which associates a network address or a group of network addresses with a single interface index, the interface index indicating the identity of one of the output ports and enabling a connection identifier to be specified for segmentation of the connectionless packet at the indicated output port, routing logic for forwarding a connectionless packet to a next-hop based on the network address carried by the packet, the logic including a routing table which associates a network address or group thereof with at least one interface index, the logic being enabled to download an interface index for a given network address or group thereof from the routing table to the same network address entry in the forwarding table time and logic for setting up a label switched path wherein a connectionless packet is associated with a connection identifier which functions as a label so that transit nodes in the label switched path can switch the connection-orientated packets constituting connectionless packets based on the connection identifier without re-assembling the connectionless packets, the logic associating the label switched path with an interface index. The interface indexes are associated with a priority hierarchy in which interface indexes associated with label switched paths have a higher priority than interface indexes associated with connectionless routing and the routing logic does not overwrite a forwarding table entry having an interface index associated with a label switched path with an interface index associated with connectionless routing.

In other aspects, the invention provides various combinations and subsets of the aspects described above.

BRIEF DESCRIPTION OF DRAWINGS

The foregoing and other aspects of the invention will become more apparent from the following description of specific embodiments thereof and the accompanying drawings which illustrate, by way of example only, the principles of the invention. In the drawings, where like elements feature like reference numerals which may bear unique alphabetical suffixes in order to identify specific instantiations of like elements):

FIG. 4 is a diagram of a data structure representing a "service interface" associated with nodes such as shown in FIG. 1;

DETAILED DESCRIPTION OF ILLUSTRATIVE EMBODIMENT

Figure 1:
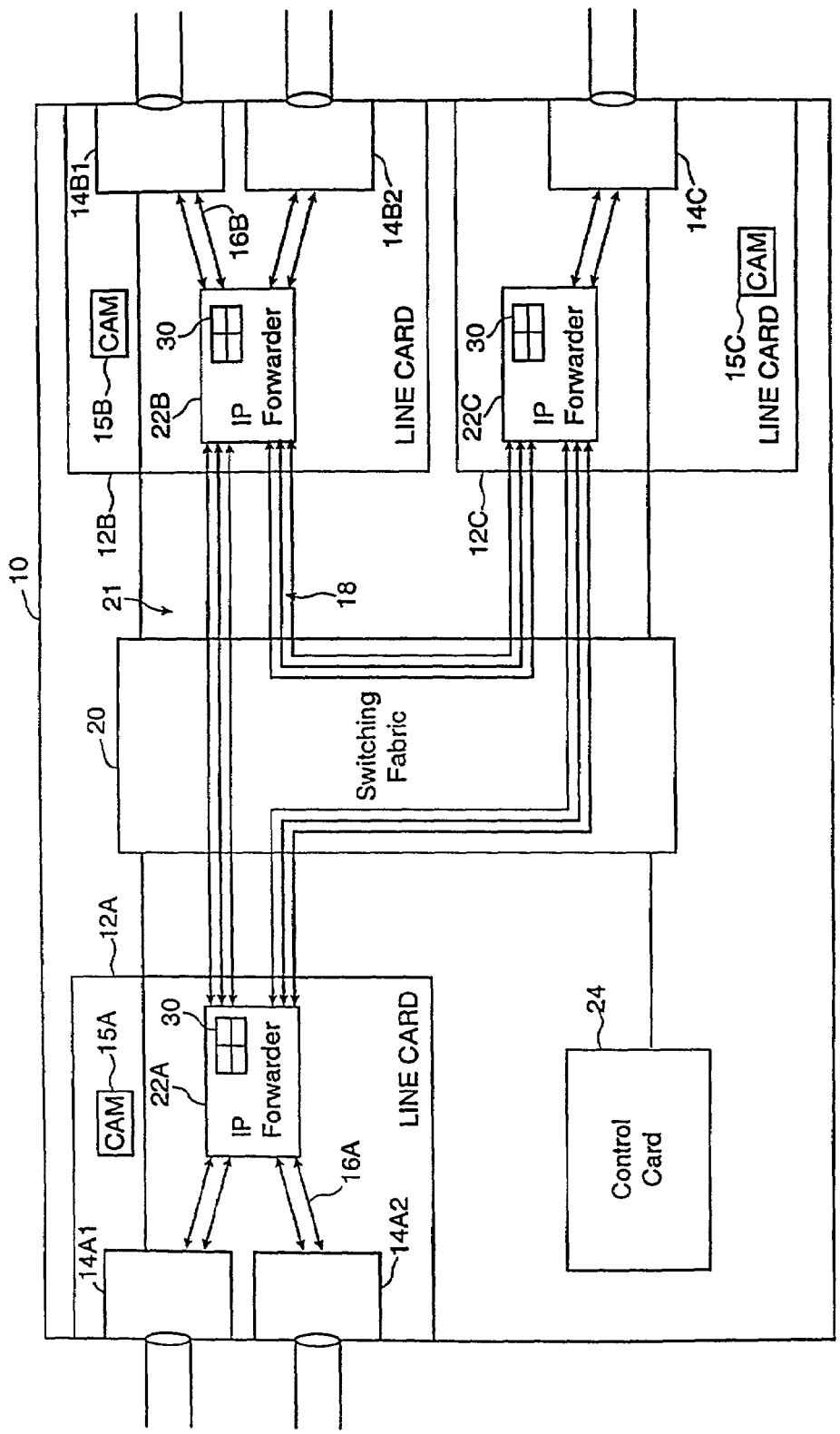
FIG. 1 is a system block diagram of a network node which processes ATM cells and IP packets.

The description which follows, and the embodiments therein, are provided by way of illustrating an example, or examples, of particular embodiments of principles of the present invention. These examples are provided for the purpose of explanation, and not limitations, of those principles. In the description which follows, like elements are marked throughout the specification and the drawings with the same respective reference numerals.

1. Overview of ATM Switching

FIG. 1 is an architectural block diagram of an exemplary dual function ATM switch and IP router 10 (hereinafter "node"). The node 10 comprises a plurality of input/output controllers such as line cards 12 which have physical interface input/output ports 14. Generally speaking, the line cards 12 receive incoming ATM cells on ports 14. Each ATM cell, in accordance with standardized ATM communication protocols, is of a fixed size and incorporates a virtual path identifier (VPI) and a virtual channel identifier (VCI) so that the cell can be associated with a particular virtual circuit (VC). For each such cell received, the line cards 12 consult a lookup table or content addressable memory (CAM) 15 keyed on VCs. The CAM 15 provides pre-configured addressing information as to the outgoing port and egress line card for each cell. This is accomplished by way of an "egress connection index", which is a pointer to a pre-configured memory location on the egress line card that stores a new VC identifier that should be attributed to the cell as it progresses its way over the next network link. The ingress line card attaches the addressing information and egress connection index to each cell and sends it to a switching fabric 20 which physically redirects or copies the cell to the appropriate egress line card. The egress line card subsequently performs the pre-configured VPI/VCI field replacement and transmits the cell out of the egress port. Further details of this type of ATM switching mechanics can be found in PCT publication no. WO95/30318, all of which is incorporated herein by reference.

The node 10 also features a control card 24 for controlling and configuring various node functions, including routing and signalling functions, as described in much greater detail below. The line cards 12 may send data received at ports 14 to the control card 24 via the switching fabric 20

Each line card supports bidirectional traffic flows (i.e., can process incoming and outgoing packets). However for the purposes of description the following discussion assumes that line card 12A and ports 14A1 and 14A2 provide ingress processing and line cards 12B, 12C and ports 14B1, 14B2, 14C1, 14C2 provide egress processing for data traffic flowing from left to right in FIG. 1.

2. Overview of IP Routing

The node of the illustrated embodiment also enables variable length packets of digital data associated with a hierarchically higher communications layer, such as Internet Protocol (IP), to be carried over the ATM transport layer infrastructure. This is made possible by segmenting each variable length packet into a plurality of ATM cells for transport. Certain VCs may thus be dedicated to carrying IP packets, while other VCs may be exclusively associated with native ATM communications.

When a cell arrives at ingress port 14A1 the line card 12A accesses CAM 15A to obtain context information for the VC of the arriving cell, as previously described. The context information may associate the VC with a "service interface". This is an endpoint to a link layer (i.e. "layer 2") path, such as an AAL5 ATM path, through a network. A number of service interfaces (SIs) may exist on each I/O port 14. These service interfaces "terminate" at an IP forwarder 22 on the same line card in the sense that, as subsequently described, the ATM cells constituting an IP packet are reassembled into the packet, following which IP forwarding procedures (as opposed to ATM switching procedures) are followed.

Figure 2:
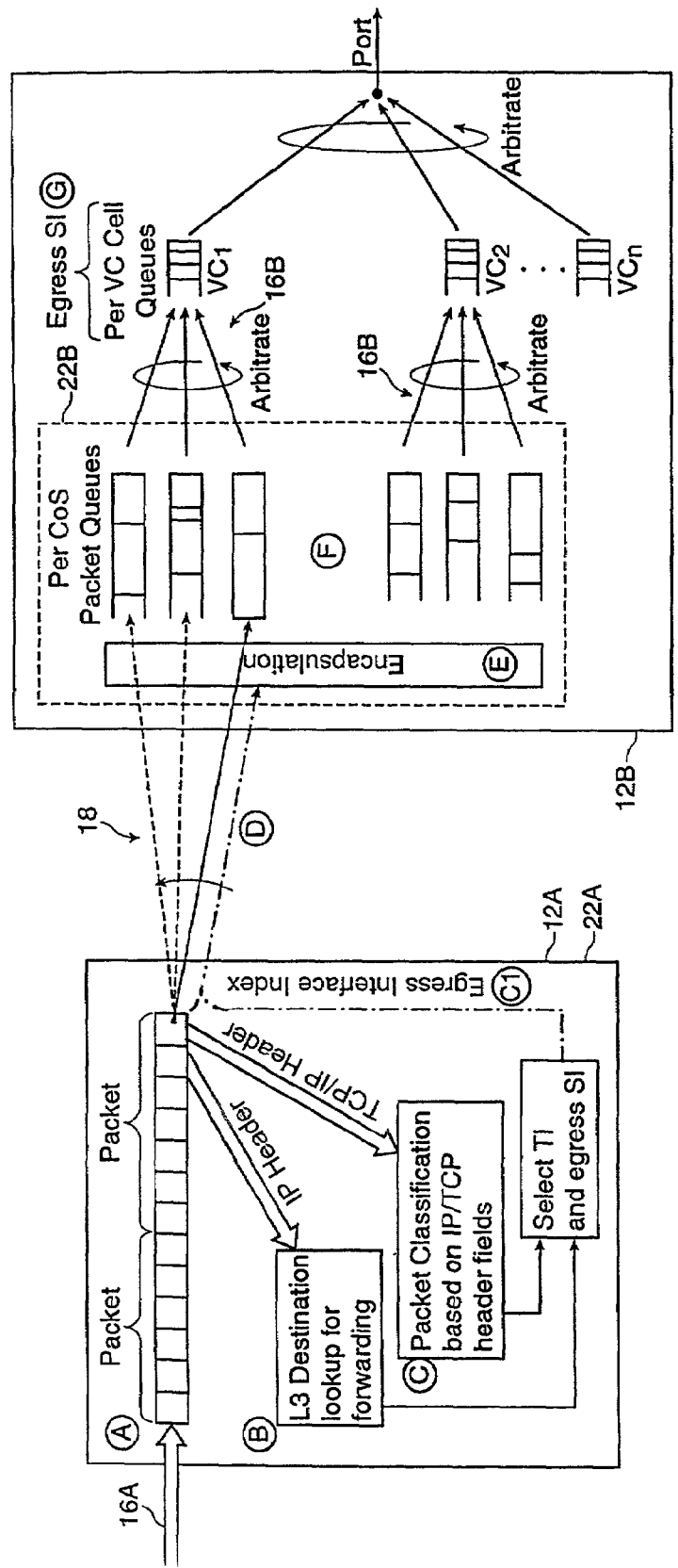
FIG. 2 is process flow diagram showing how IP packets are processed in the node of FIG. 1.

The essence of IP forwarding is that an IP packet received at one SI is re-transmitted at another SI. Referring additionally to the process flow chart shown in FIG. 2, the forwarding process for IP packets can be logically divided into three transport stages, separated by two processing stages, through the node.

The first transport stage, schematically represented by arrows 16A, carries ATM cells associated with an ingress SI from the ingress port 14A1 to the ingress IP forwarder 22A.

The second transport stage carries IP packets from the ingress IP forwarder 22A across the switching fabric 20 to an egress IP forwarder, e.g., forwarder 22B. This second transport stage is implemented via a "connection mesh" 21. Within the connection mesh eight internal connections or transport interfaces (TIs) 18 are set up between each pair of IP forwarders 22 (only three TIs are shown). The TIs are provided so as to enable different levels or classes of service (COS) for IP packets.

The third transport stage, schematically represented by arrows 16B, carries IP packets from the egress IP forwarder 22B to the egress port, e.g. port 14B1, and egress SI.

Figure 3:
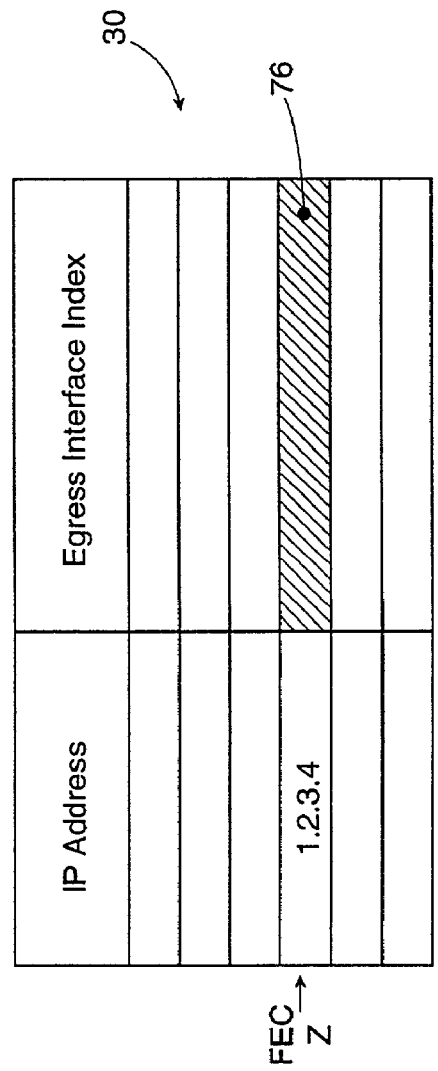
FIG. 3 is a diagram of a forwarding table employed by IP forwarders associated with input/output controllers of the node of FIG. 1.

The first processing stage occurs at the ingress IP forwarder 22A, where the ATM cells associated with an ingress SI are reassembled into IP packets. This is shown as step "A" in FIG. 2. At step "B" the IP forwarder 22A then examines the destination IP address of the packet in order to determine the appropriate egress SI for the "next hop" through the network. This decision is based on an IP forwarding table 30 (derived from IP protocols, as discussed in greater detail below) shown schematically in FIG. 3. Each record of table 30 includes an IP address field 32 and an "egress interface index" field 36. The IP destination address of the packet is looked up in the IP address field 32 to find the longest match thereto (i.e., the table entry which resolves the packet IP address destination as far as possible). The corresponding egress interface index essentially specifies the egress line card 12B, egress IP forwarder 22B, and the egress SI for the packet (see more particularly the discussion with reference to FIG. 8A). The egress interface index is attached to the IP packet.

In addition, at step "C" the IP forwarder 22A examines the class of service (COS) encapsulated by the packet. Based partly on the encapsulated COS and internal configuration, the IP forwarder 22A selects one of the second-stage TIs 18 which will reach the egress forwarder 22B with a desired class of service. In order to traverse the switching fabric 20, the ingress IP forwarder 22A re-segments the IP packet into ATM cells (shown schematically as step "D") and attaches addressing information to each cell indicating that its destination is the egress IP forwarder 22B.

The second, smaller, processing stage occurs at the egress IP forwarder 22B, where the egress interface index is extracted from the packet and it is modified at step "E" to match the encapsulation associated with the egress SI. Thus, the VPI/VCI associated with the egress SI is attached to the packet. The packet is then delivered to that egress SI (labelled "G") using the third-stage transport 16B corresponding thereto. In this process the packet is segmented once again into ATM cells which are buffered in cell queues associated with the egress SI and/or output port 14B1. A queuing and possible congestion point (labelled "F") also occurs between the second processing and third transport stage—that is, between the egress IP forwarding module 22B and the egress SI (labelled "G").

It will be seen from the foregoing that effecting IP forwarding functionality on an ATM platform is a relatively involved process, requiring that the IP packet be: (a) reassembled at the ingress IP forwarder 22A, (b) subsequently segmented for transport over the switching fabric, (c) reassembled at the egress forwarder 22B, and (d) subsequently re-segmented for transmission out of the output port. In addition, a non-trivial IP address lookup has to be performed at the ingress forwarder 22A. These steps have to be performed at each network node and hence increase the latency of end-to-end communication.

3. Introduction to MPLS

In order to avoid having to perform the above procedures on each and every packet, the node 10 provides multi-protocol label switching (MPLS) capability. In conventional IP forwarding, routers typically consider two packets to be in the same "forward equivalency class" (FEC) if there is some address prefix in that router's tables which is the longest match for the destination address of each packet. Each router independently re-examines the packet and assigns it to a FEC. In contrast, in MPLS a packet is assigned to a FEC only once as the packet enters an MPLS domain, and a "label" representing the FEC is attached to the packet. When MPLS is deployed over an ATM infrastructure, the label is a particular VC identifier. At subsequent hops within an MPLS domain the IP packet is no longer examined. Instead, the label provides an index into a table which specifies the next hop, and a new label. Thus, at subsequent hops within the MPLS domain the constituent ATM cells of a packet can be switched using conventional ATM switching techniques. Such paths are known in the art as label switched paths (LSPs), and LSPs may be manually set up as permanent label switched paths (PLSP) by network operators. Alternatively, a label distribution protocol (LDP) may be employed wherein the network automatically sets up the path upon command from the network operator. Such paths are typically referred to in the art as soft-permanent or signalled LSPs (SLSPs). Further details concerning MPLS can be found in the following draft (i.e work in progress) MPLS standards or proposals, each of which is incorporated herein by reference:

[1] Rosen, A. Viswanathan, R. Callon, *Multiprotocol Label Switching Architecture*, draft ietf-mpls-arch-06.txt.

[2] L. Andersson, P. Doolan, N. Feldman, A. Fredette, B. Thomas, *LDP Specification*, draft-ietf-mpls-ldp-06 txt. This LDP is hereinafter referred to as "LDP Protocol".

[3] B. Davie, J. Lawrence, K. McCloghrie, Y. Rekhter, E. Rosen, G. Swallow, P. Doolan, *MPLS Using LDP and ATM VC Switching*, draft-ietf-mpls-atm-02.txt.

[4] B. Jamoussi, *Constraint-Based LSP Setup using LDP*, draft-ietf-mpls-cr-ldp-01.txt. This LDP is hereinafter referred to as "CRLDP".

[5] E. Braden et al., *Resource Reservation Protocol*, RFC 2205. This LDP is hereinafter referred to as "RSVP".

The node 10 implements MPLS functionality through an SI linkage, as will be better understood by reference to FIG. 4 which shows the SI in the context of a management entity or record. The SI has an internal ID number associated therewith. In addition to representing an ATM link layer endpoint, the SI also represents an IP address for layer 3 functionality, and indicates what type of encapsulation is used for IP purposes. Each SI may also be associated with a number of other attributes and methods. In particular, SIs can be associated with the following methods or applications: (1) IP forwarding, (2) MPLS forwarding, (3) IP routing, and (4) MPLS signalling. In other words, the node 10 can be configured to (1) forward IP data packets to the next hop router via the above described IP forwarding procedures discussed above; (2) forward IP data packets via MPLS forwarding procedures as will be discussed below; (3) process packets carrying messages for IP routing protocols, and (4) process packets carrying messages for MPLS signalling protocols.

4. Overview of MPLS Architecture

Figure 5:
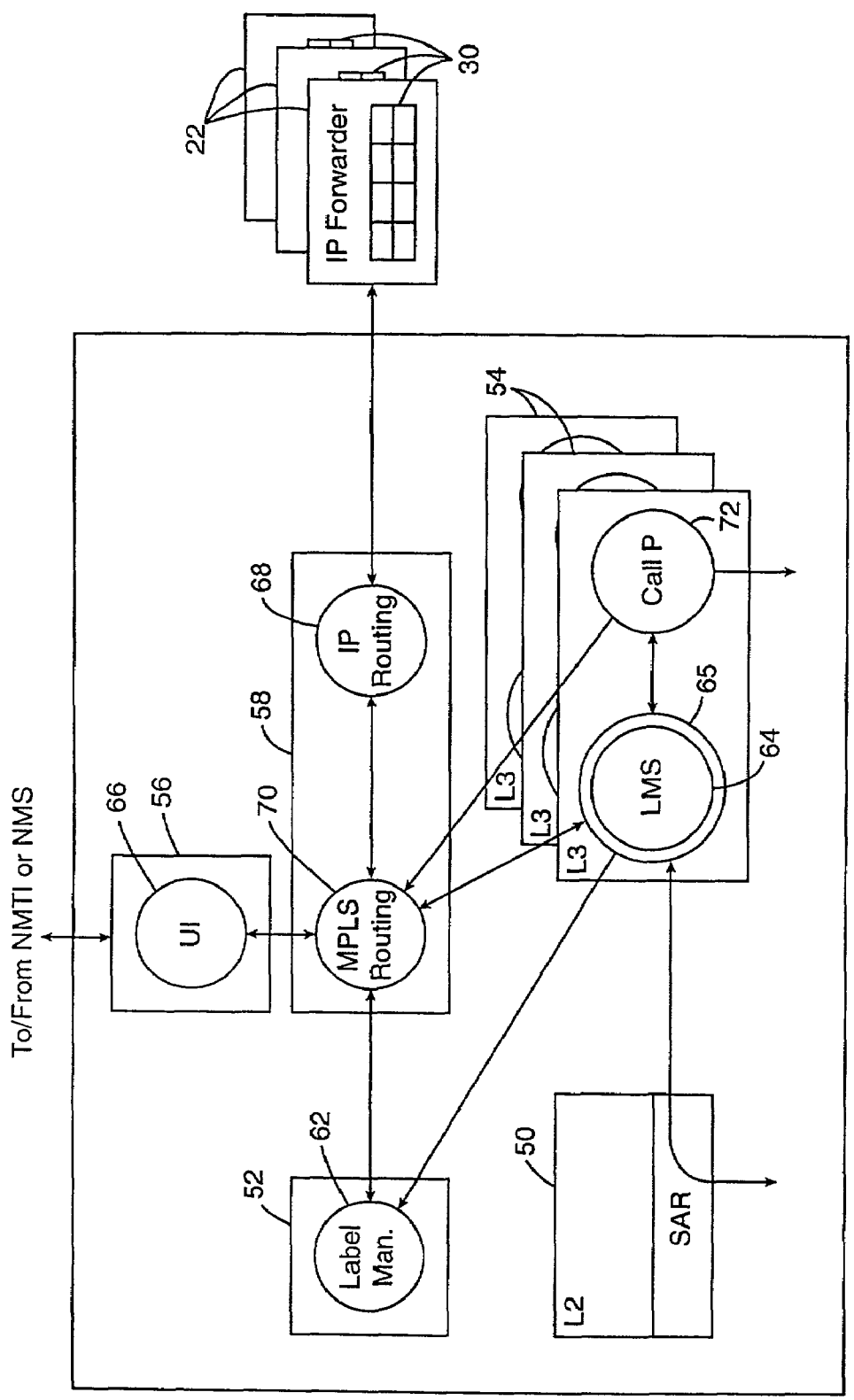
FIG. 5 is an architectural block diagram of hardware processors and software processes associated with a control card on the node of FIG. 1.

FIG. 5 shows the hardware and software architecture of the control card 24 in greater detail. From the hardware perspective, the card 24 employs a distributed computing architecture involving a plurality of discrete physical processors (which are represented by rectangular boxes in the diagram).

Processor 50 handles layer 2 ("L2") ATM adaptation layer packet segmentation and reassembly functions for signalling messages. As mentioned, certain SIs will be associated with various types of routing protocols and upon receipt of a packet associated with one of these SIs the ingress IP forwarder 22A sends the packet (which is re-segmented to traverse the switching fabric 20) to the L2 processor 50. After re-assembly, the L2 processor 50 sends signalling messages associated with IP routing protocols to a software task termed "IP Routing" 68 which executes on a routing processor 58. (The connection between the L2 processor 50 and IP Routing 68 is not shown). Signalling messages associated with MPLS LDP protocols are sent to a label management system task (LMS) 64 executing on a layer 3 (L3) processor 54. Outgoing messages from the LMS 64 and IP Routing 68 are sent to the L2 processor 50 for subsequent delivery to the appropriate egress line card and egress SI.

Figure 6:
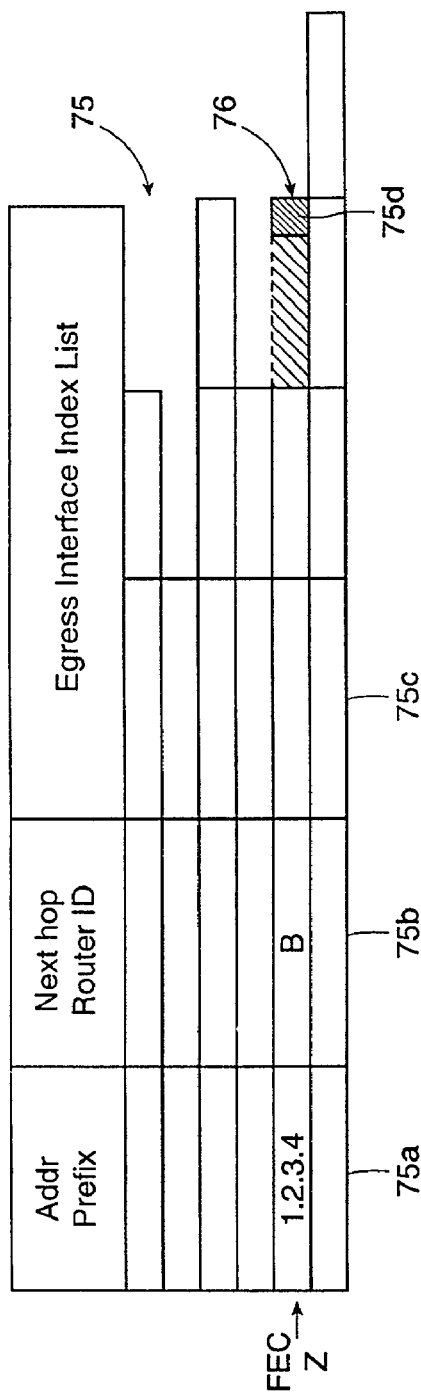
FIG. 6 is a master IP routing table associated with an IP network.

IP Routing 68 runs an IP interior gateway or routing protocol such as IBGP, ISIS, PIM, RIP or OSPF. As a result of these activities IP Routing 68 maintains a master IP routing table 75 schematically shown in FIG. 6. Each record of to master table 75 includes a field 75*a* far an IP address field, a field 75*b* for the next hop router ID (which is an IP address in itself) corresponding to the destination IP address or a prefix thereof, and a list 75*c* of egress interface indexes associated with the next hop router ID. As the network topology changes, IP Routing will update the forwanding tables 30 of IP forwarders 22 by sending the appropriate egress interface index to it. (Note that table 30 only has one egress interface index associated with each IP destination address entry).

As shown in FIG. 5, the node 10 employs a plurality of L3 processors 54, each of which includes an LMS 64. Each LMS 64 terminates the TCP and UDP sessions for the LDP signaling links (LDP Session) and runs a state machine for each LSP. As discussed in greater detail below, the LMS 64 receives requests to set up and tear down LDP Sessions, and to set up and tear down SLSPs.

LMS 64 is commercially available from Harris & Jeffries of Dedham, Mass. For intercompatibility purposes, the node 10 includes "translation" software, the MPLS context application manager (MPLS CAM) 65, which translates and forwards incoming or outgoing requests/responses between the LMS and the remaining software entities of the control card 24.

Each L3 processor 54 also includes a call-processing task 72. This task maintains state information about connections which have been requested.

Another processor 56 provides user interface functionality, including interpreting and replying to administrative requests presented through a central network management system (NMS) (such as the Newbridge Networks Corporation 46020™ product) or through command instructions provided directly to the node via a network terminal interface (NTI) For MPLS functionality, a user interface 66 is provided for accepting and replying to management requests to program PLSPs, SLSPs, and LDP Sessions.

A resource control processor 52 is provided for allocating and de-allocating resources as connections are established in the node. For MPLS functionality, processor 52 includes a label manager task 62 which allocates unique label values for LSPs.

On the routing processor 58, a software task termed "MPLS Routing" 70 interfaces between the UI 66, IP Routing 68 and the LMSs 64 running on the L3 processors 54. Broadly speaking, MPLS Routing 70 manages SLSPs. For example, during path setup, MPLS Routing 70 receives an SLSP setup request from the user interface 66, retrieves next hop routing information from IP Routing 68, chooses an LDP Session to the next hop, and calls the appropriate instantiation of the LMS 64 to set up the SLSP path using the selected LDP Session. When a label mapping is received for the path, the LMS 64 informs MPLS Routing 70. MPLS Routing 70 then triggers an update to the forwarding tables 30 of the IP forwarders 22 for the new path. Similarly, when the network topology changes, MPLS Routing 70 reflects these changes into the MPLS routing domain. The functions of MPLS Routing are the focus of the remainder of this description.

5. Reference Network

Figure 7:
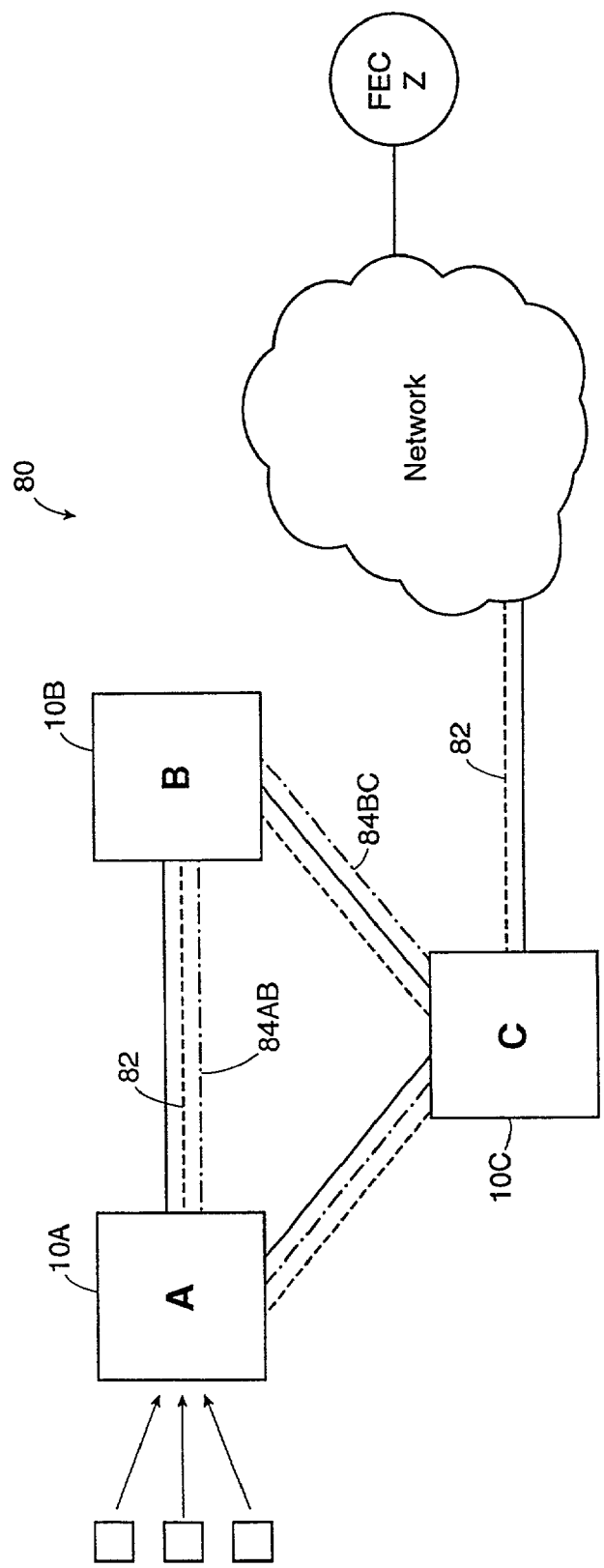
FIG. 7 is a diagram of a reference network illustrating an MPLS domain within an IP network.

FIG. 7 shows a reference IP network 80 wherein an MPLS routing domain exists amongst routers/nodes A, B and C, the remaining of the network 80 employing IP specific routing protocols such as OSPF. Assume the network operator wishes to establish an SLSP, commencing from node A, for IP destination address 1.2.3.4 (hereinafter "FEC Z") located somewhere in the network. (Note that a FEC, as per the draft MPLS standards, comprises a destination IP address and a prefix thereof.) The network operator may enter a management command at node A via its NMTI or the NMS (not shown) requesting the establishment of a SLSP for FEC Z. Depending on the type of label distribution protocol employed (e.g., LDP Protocol, CRLDP, or RSVP) the network operator may specify the destination node for the SLSP, or even explicitly specify the desired route for the SLSP up to some destination node (i.e., a source-routed SLSP). In the further alternative, the label distribution protocol may use a best effort policy (e.g., in LDP Protocol) to identify nodes (within the MPLS routing domain) as close as possible to the destination address of FEC Z. In the illustrated reference network, assume that node C is the "closest" node within the MPLS routing domain for FEC Z.

In the network 80, signalling links 82 (which are associated with particular SI's) are provided for communicating IP routing messages between the nodes. In addition, signalling links 84 are provided for communicating MPLS label distribution protocol messages therebetween. Each signalling link 84 has an LDP Session associated therewith.

For the purposes of nomenclature, unless the context dictates otherwise, the term "ingress SLSP" is used to identify the SLSP at the originating node (e.g., node A), the term "transit SLSP" is used to identify the SLSP at transiting nodes (e.g., node B), and the term "egress SLSP" is used to identify the SLSP at the destination node (e.g., node C).

The reference IP network shown in FIG. 7 is used to provide the reader with a typical application which will help to place the invention in context and aid in explaining it. Accordingly, the invention is not limited by the particular application described herein.

6. Database Management of SLSPs

Figure 8:
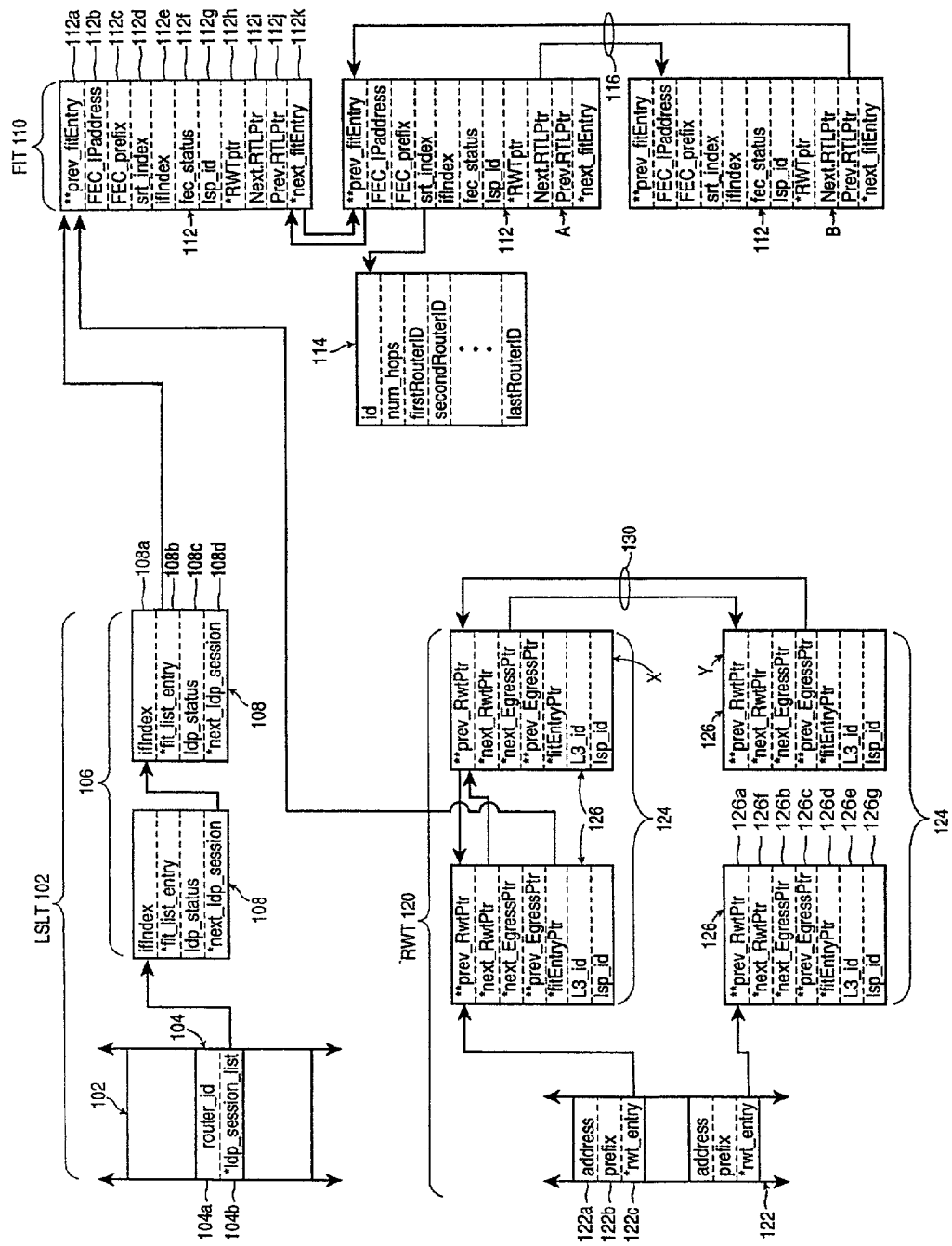
FIG. 8 is a schematic diagram of a database employed by the node of FIG. 1 to manage signalled label switched paths (SLSPs)

In order to create, monitor and keep track of ingress, transit and egress SLSPs, MPLS Routing 70 maintains a number of tables or data repositories as shown in the database schema diagram of FIG. 8. Since each SLSP is managed by an LDP Session, MPLS Routing 70 on each node keeps track of the various LDP Sessions which have been set up between the node and its LDP peer routing entities using an LDP signalling database (LSLT) 100. The LSLT 100 comprises a hash table 102 having one entry or record 104 per LDP routing peer. Record 104 contains a router id field 104a which functions as the index for the hash table 102 and a pointer 104b (i.e., *ldp_session_list) which points to an LDP session list 106. The router id field 104a stores the IP address of the LDP peer router to which one or more LDP Sessions have been configured. Each LDP Session is represented by an entry or record 108 in the pointed-to LDP session list 106. Note that multiple LDP Sessions can be configured between the node and a given MPLS peer router and hence the session list 106 can have multiple entries or records 108. In FIG. 8, two LDP Sessions have been configured with respect to the LDP peer router identified by the illustrated router id field 104a, and hence two records 108 exist in the corresponding LDP session list 106.

Figure 8A:
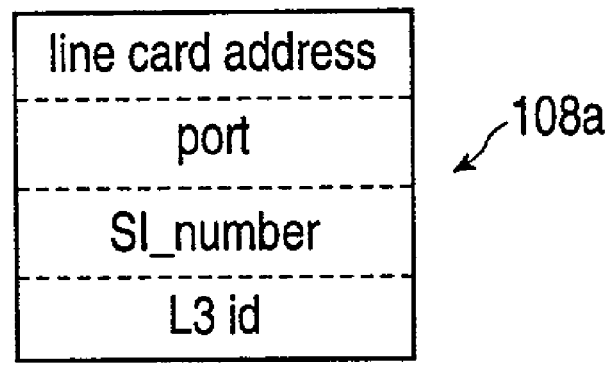
FIGS. 8A and 8B show certain fields of the database of FIG. 8 in greater detail.

Each record 108 of the LDP session list 106 comprises the following fields:

ifIndex (108a)—A unique number within the node 10 which identifies a particular interface index and SI which has been configured for the LDP application. FIG. 8A shows the structure of the ifIndex field in greater detail. It comprises a node-internal device address for the line card/IP module responsible for the SI, the egress port, the SI ID number (which is only unique per line card) and an identification code or internal device address for the L3 processor 54 on the control card 24 handling the LDP signalling link.

*fit_list_entry (108b)—A pointer to a FEC information table (FIT) 110. The FIT, as described in greater detail below, keeps track of all ingress SLSPs stemming from the node. The fit_list_entry pointer 108b points to a list within FIT 110 of the ingress SLSPs associated with this LDP Session.

ldp_status (108c)—A status indication. The status includes a one bit flag (not shown) indicating whether or not the LDP Session is in use and a one bit flag (not shown) indicating whether resources are available for the LDP Session. An LDP Session is considered to have no resources available when there are no labels available for allocation or when the associated SI becomes non-operational.

*next_ldp_session—A pointer to another LDP Session record 108 associated with the same LDP peer router.

The FIT 110 keeps track of ingress SLSPs, i.e., SLPs which have commenced from the node. (Note that the FIT 110 does not keep track of transit or egress SLSPs) A FIT entry or record 112 is created by MPLS Routing 70 when an SLSP is configured and record 112 is removed from the FIT 100 when an SLSP is deleted.

Each FIT entry or record 112 comprises the following elements:

**prev_fitEntry (112a)—A pointer to a pointer which references the current entry. This is used for ease of addition and removal from a list.

FEC—IP destination for an LSP. The FEC consists of an IP destination address 112b and a prefix 112c for which the LSP is destined, as per the draft standards.

Figure 8B:
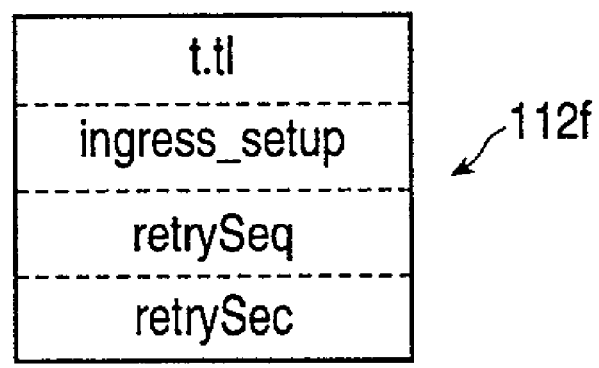

Srt_index (112d)—An index into a source-route table or list (SRT) 114. This takes on the value 0 if the LSP is not source-routed and >0 if it is. In the event the SLSP establishment command includes a source routed path, the router ID IP addresses are stored in the SRT 114 in sequential order, as shown.

ifIndex (112e)—Specifies the egress line card and egress SI used to reach the next hop router for the FEC. The structure of this field is the same as shown in FIG. 8A. Note, however, that in the FIT 110 this field 112e specifies the SI for the egress data path (as opposed to signaling channel) for the FEC.

fecStatus (112f)—The state of this FIT entry as represented (see FIG. 8B) by a ttl value, an ingressSetup flag, a retrySeq counter, and a rertySec counter. The ttl value indicates a time to live value that should be decremented from the incoming packets. The ingresSetup flag indicates that the SLSP is successfully established. The retrySeq counter keeps track of the number of times MPLS Routing has tried to set up this SLSP, as described in greater detail below. The retrySec counter keeps track of how many seconds are left until the next retry is attempted.

lsp_id (112g)—A unique identifier used to identify an SLSP within an MPLS domain. In the present embodiment the identifier comprises a concatenation of the node's IP router ID plus a unique number selected by the UI 66 to uniquely identify the LSP within the node. The lsp_id is also used as a hash key for the FIT 110.

*RWTptr (112h)—A pointer to a route watch database (RWT) 120 described in greater detail below.

Next.RTLPtr (112i), prev.RTLPtr(112j)—Forward and backward pointers used to keep track of FIT entries 112 in which the ingressSetup flag of the fecStatus field 112f indicates that the corresponding SLSP has not been successfully set up. These pointers are basically used to implement a retry list (RTL) 116 which is embedded in the FIT 110. For example, the FIT entries 112 labelled "A" and "B" form part of the RTL 116. The RTL thus enables the node to quickly traverse the FIT 110 to find pending SLSPs for all peer routers.

*next_fitEntry (112k)—A pointer to the next FEC/FIT entry which has been set up using the same LDP Session as the current FEC/ FIT entry.

The RWT 120 keeps track of all SLSPs handled by the node, i.e., ingress, transit and egress SLSPs. The RWT 120 comprises a hash table 122 which includes an IP designation address field 122*a,* an IP prefix field 122*b,* and a *rwt-entry 122C which points to a list 124 of LSPs described in greater detail below.

The IP destination address and prefix fields 122*a* and 122*b* are used to store different types of management entities depending on the particular label distribution protocol employed. These entities may be: (a) the FEC, for LDP Protocol; (b) the destination node's router ID, for non source-routed RSVP; (c) the next node's router ID for strict source-routed CR-LDP and RSVP; and (d) the next hop in the configured source-route for loose source-routed CR-LDP and RSVP. These can all be summarized as the next hop that an SLSP takes through the network.

Note that table 122 is hashed based on the IP prefix field 122*b.* There can be several requested SLSPs all referring to the same IP prefix at a transit node or egress node. Each individual SLSP is identified by a separate entry or record 126 in the LSP list 124. However, there can only be one ingress SLSP associated with any given IP prefix on the node 10 (In other words, an entry 126 exists for every next hop request received from the LMS 64 as well as one entry for an ingress SLSP which has been created on the node. Note too that egress SLSPs also request next hop information and therefore are included within this table).

Each LSP list entry 126 comprises the following elements:

prev_RwtPtr (126*a*), next_RwtPtr (126*f*)—Forward and backward pointers used to keep track of additional entries 126 for a specific IP prefix. All of the LSPs associated with the same IP prefix 122*b* are linked together using pointers 126*a* and 126*f.* next_EgressPtr (126*b*), prev_EgressPtr (126*c*)—Forward and backward pointers used to keep track of egress SLSPs which may possibly be extended when a new LDP Session is configured, as discussed in greater detail below. These pointers are basically used to implement an LSP egress table or list (LET) 130 which is embedded in the RWT 120. For example, in FIG. 8 the RWT entries 126 labelled "X" and "Y" belong to the LET 130. An entry 126 is added to the LET 130 whenever a best effort routing policy (e.g., LDP Protocol) is employed in setting up an SLSP and the node 10 can find no further LDP signalling links "closer" to the destination address of the corresponding FEC. For example, in establishing an SLSP for FEC Z in the reference network, node C (which lies at the boundary of the MPLS routing domain) cannot find any more LDP signalling links heading towards the destination address of FEC Z, and thus when node C creates a RWT entry 126 for this SLSP the entry will be added to the LET.

fitEntryPtr (126*d*)—Pointer to the FIT entry 112 which corresponds to this RWT entry 126. The value of this field will be null for all entries except for ingress SLSPs created at this node.

L3_id (126*e*)—The address or identity of the L3 processor which initially requested the next hop request for the LSP or the address or identity of the L3 processor which is used to set up an ingress SLSP.

lsp_id (126*g*)—Same as lsp_id 112*g* in FIT 110, except that these LSPs may have been initiated at other nodes.

7. Establishing an LDP Session

LDP Sessions are configured via management requests which are received through the UI 66 and forwarded to MPLS Routing 70. The data obtained by the UI 66 includes the ATM link layer end point of the LDP signalling link SI (i.e.—line card address, port, VPI/VCI), IP address assigned to the SI, and LDP specific parameters such as label range, label space ID and keep-alive timeout.

MPLS Routing 70 employs a round-robin algorithm to select one instantiation of the LMS 64 (i.e., one of the L3 processors 54) and requests the associated MPLS CAM 65 to establish a new LDP Session. The MPLS CAM enables the LDP signalling application on the SI selected by the network operator and configures the node, including a filtering mechanism (not shown) associated with the L2 processor 50, to allow all LDP packets associated with a particular LDP signalling SI to be propagated (in both the ingress and egress directions) between the line cards 12 and the selected LMS/L3 processor 54. Once this is carried out, the LMS 64 sends out LDP session establishment messages to the LDP peer router in accordance with the applicable label distribution protocol (e.g., LDP Protocol, CRLDP, RSVP). These include "hello" and other session establishment messages.

Once an LDP Session has been established with the LDP peer router, the LMS 64 informs the label manager 62 of the negotiated label range for the LDP Session (which is a function of establishing an LDP Session as per the draft standards). The LMS 64 also passes the IP address of the LDP peer router to MPLS Routing 70 which stores this address in the router ID field 104*a* of the LSLT100. In addition, the LMS 64 passes the interface index identifying the LDP signalling SI to MPLS Routing 70 which stores it in the ifIndex field 108*a* of the LSLT 100.

8. Establishing an SLSP 8.1 Procedures at the Ingress Node

Referring to the reference network, an SLSP must be explicitly established at node A for FEC Z by the network operator via the NMTI of node A or via the NMS which communicates with node A. The instruction to configure the SLSP includes as one of its parameters Z, i.e., the destination IP address and prefix thereof for FEC Z. The command is received and interpreted by the UI 66.

The UI 66 selects a unique LSP ID which, as previously discussed, preferably comprises a concatenation of the node's IP router ID and a unique number. The UI 66 then requests MPLS Routing 70 to create an SLSP for FEC Z and associate it with the selected LSP ID.

MPLS Routing 70 requests next hop information for FEC Z from IP Routing 68. This will occur for non-source-routed LSPs in order to obtain the next-hop information as well as for source-routed LSPs in order to verify the information in the source-route (which will be supplied by the network operator). More specifically, MPLS Routing 70 executes the following procedure to initiate the establishment of an SLSP for this new FEC.

Figure 9:
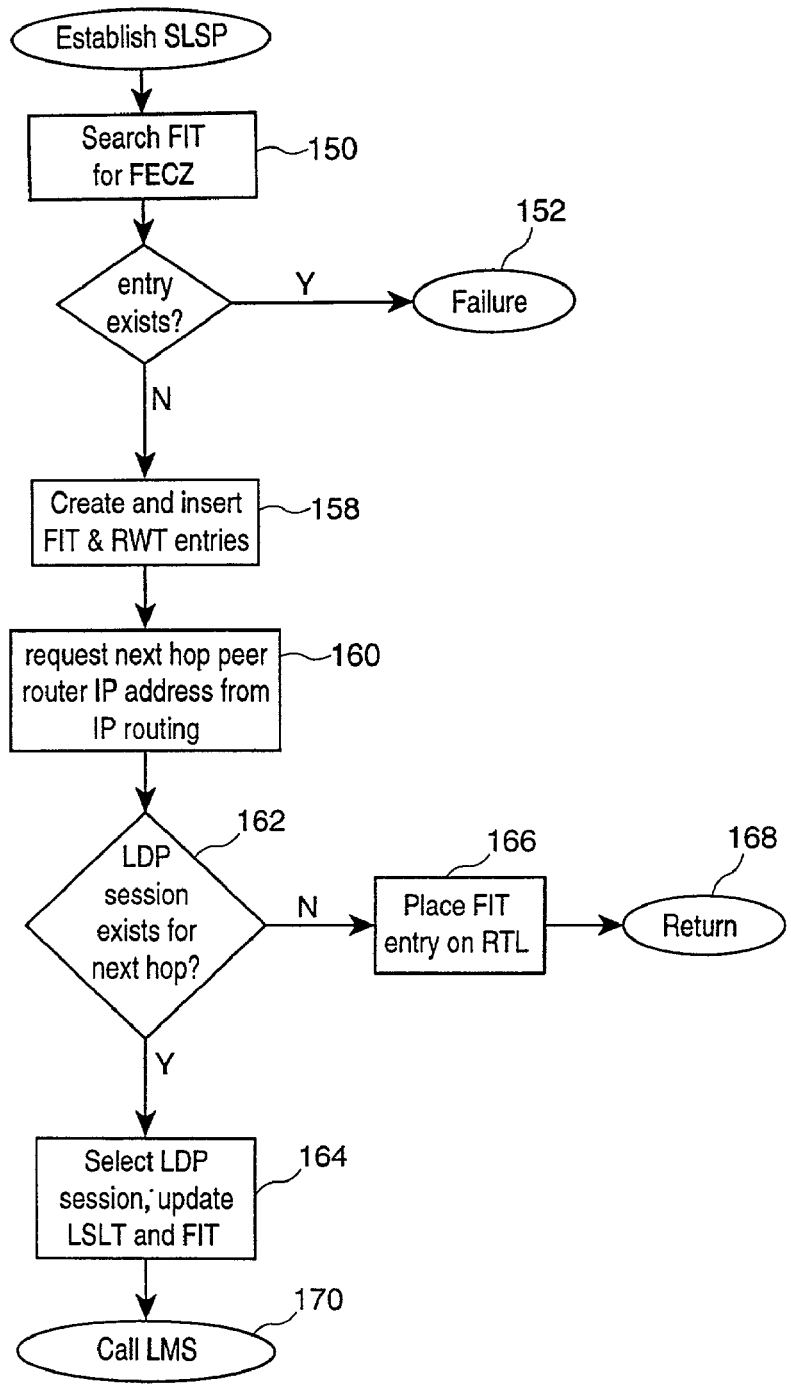
FIGS. 9 and 10 are logic flow charts showing the steps executed by the node of FIG. 1 in establishing an SLSP.

Referring additionally to FIG. 9, at a first step 150 MPLS Routing 70 searches the FIT 110 for an existing entry 112 having the same IP destination address and prefix as FEC Z. If such an entry exists in the FIT 110 then at step 152 MPLS Routing 70 returns with a failure code indicating that FEC Z has already been established from this node. At step 158, MPLS Routing 70 creates a new FIT entry 112 and appends it to the FIT 110. A corresponding entry 126 is also inserted into the LSP list 124 for FEC Z in the RWT hash table 122. If necessary, MPLS Routing 70 adds a new entry 122 to the RWT 120 which includes the IP prefix and address of FEC Z, or the IP prefix and address of the first hop in the explicit route.

At step 160 MPLS Routing 70 requests IP Routing 68 to provide the peer IP address for the next hop to reach FEC Z (or the destination node's router id for non source-routed RSVP, or the next hop in the configured source-route for loose source-routed CR-LDP and RSVP). Once obtained, at step 162 MPLS Routing 70 searches for an LSLT entry 102 which matches the next hop router ID. If a matching LSLT entry exists, then at step 164 MPLS Routing 70 selects an available LDP Session from the corresponding LDP Session list 106. This is a circular linked list, which is managed such that the *ldp_session_list pointer 104*b* in the LSLT entry 102 points to the LDP Session to be used for the next SLSP setup which is selected by MPLS Routing 70. Once the LDP Session is selected, the recently created FIT entry 112 for FEC Z is linked (via the **prev_fitEntry and *next-FitEntry pointers 112*a* and 112*i*) to other FIT entries using the same LDP Session.

The *next_ldp_session pointer 108*d* points to the next session in the LDP session list. (If there is only one LDP Session in the list then the *next_ldp_session points to itself.) Once the link between the FIT 110 and LDP session list 106 is created, MPLS Routing 70 updates the *ldp_session_list pointer 104*b* to point to the next session in the LDP session list with resources. This results in a round robin approach to selecting LDP Sessions for a given FEC. If no sessions to the peer LDP router have resources, the ldp_session_list pointer 104*b* is not updated. In this case, the list is traversed once when a path is setup before MPLS Routing 70 stops looking for a session.

Note also that if MPLS Routing 70 does not find an LSLT entry 102 which matches the next hop router ID, then no LDP signaling link exists thereto. In this case MPLS Routing 70 adds the recently created FIT entry for FEC Z to the RTL at step 166 and returns at step 168 with an appropriate failure code.

Figure 10:
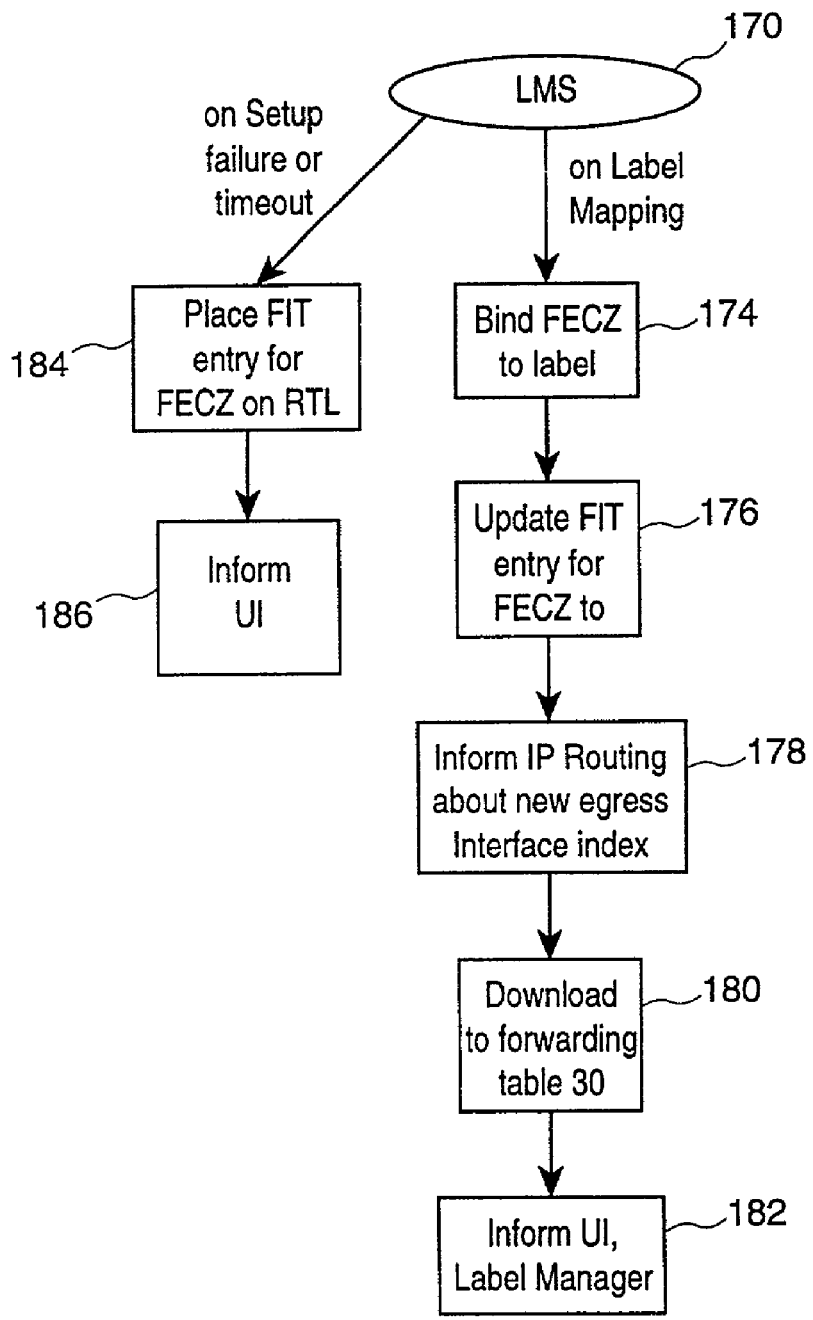

Once an LDP Session has been selected to signal the establishment of the SLSP, then at step 170 MPLS Routing 70 requests the LMS 64 to signal the set up of an SLSP. The LMS 64 of node A sends a label request message, as per the draft LDP standards, to its downstream LDP peer router, node B, indicating the desire to set up an LSP for FEC Z. The label request message is propagated downstream across the MPLS routing domain in accordance with the routing protocol (hop-by-hop or source routed) to the egress node C, and label mapping messages are propagated upstream back to the ingress node A. Ultimately, as shown in FIG. 10, a label message should be received inbound on the LDP signalling link selected by MPLS Routing 70 for FEC Z. This label message identifies the label, i.e., VPI/VCI value, that should be used to forward IP packets and the ATM cells thereof to node B. The label is passed to MPLS Routing 70 and to the label manager 62. In addition, at step 174 the LMS 64 signals the call processor 72 to configure an egress interface index for the SI being used on the egress line card and port to handle the data traffic. (Note that the egress line card will be the same line card and port associated with the LDP signaling SI for FEC Z.) This "binds" FEC Z to the ATM VPI/VCI label. The binding is reported to MPLS Routing 70 which searches the FIT 110 at step 176 for the entry 112 matching FEC Z, whereupon the ifIndex field 112*e* is updated with the egress interface index obtained from the call processor 72.

In addition, MPLS Routing 70 updates the fecStatus field 112*f* (FIG. 8B) by setting the retrySeq and retrySec counters to zero and sets the ingressSetup flag to one thereby indicating successful set up. At step 178 MPLS Routing 70 informs IP Routing 68 about the newly established SLSP and its egress interface index whereupon the latter task updates its IP forwarding table 75 (FIG. 6) to add the newly established egress interface index (shown schematically by ref no. 76) to the appropriate list 75*c*. IP Routing 68, in turn, may have a number of potential egress interface indexes in list 75*c*, which may be used to forward a packet. In order to decide amongst these alternatives, IP Routing 68 employs a priority scheme which grants an MPLS-enabled egress interface index (there can only be one per FEC) higher priority than non-MPLS egress interfaces. The priority scheme is carried out through the mechanism of a bit map 75*d* (only one shown) which is associated with each entry of the egress interface index list 75*c*. The bit map 75*c* indicates what type of application, e.g., SLSP or IP, is associated with the egress interface index entry. Following this priority scheme, at step 180 IP Routing downloads the newly created egress interface index 76 to the forwarding tables 30 of each IP forwarding module. (Table 30 only lists a single egress interface index for each IP address or prefix thereof). Asynchronously, MPLS Routing 70 also informs the UI 66 at step 182 that the ingress SLSP for FEC Z has been successfully created.

In the event that no label mapping message is received within a predetermined time period, or the signalling message that is received from node B denies the setup of an SLSP for FEC Z, the LMS 64 informs MPLS Routing 70 of the failure at step 184. MPLS Routing consequently places the FIT entry 112 for FEC Z on the RTL 116, sets the fecStatus ingressSetup field (FIG. 8B) to zero and increments the value of the retrySeq field (up to a max of 6). At step 186, MPLS Routing informs the UI 66 of the failure.

The retry mechanism for FIT entries is a linear back off mechanism which causes an SLSP path setup to be retried at 10, 20, 30, 40, 50, and 60 seconds. There is one retry timer associated with MPLS Routing 70 which goes off every 10 seconds. At this point MPLS Routing traverses the RTL 116, decrementing the amount of time (retrySec_FIG. 8B) left for each FIT entry 112 in the RTL 116. If the retrySec value is zero, the FIT entry 112 is removed from the RTL 116, the retry sequence number is incremented by one and another attempt is made to establish the ingress SLSP. If the retry is successful retrySeq is set to zero and the ingressSetup flag is set to 1. If the retry is unsuccessful then the FIT entry is added back to the RTL, retrySeq is incremented (max. sequence number is preferably 6). When the retrySeq counter is increased, the time period within which MPLS Routing 70 will retry to set up the SLSP also increases to the next highest interval. For instance, when retrySeq increases from 2 to 3 the time interval between retries increases from 20 to 30 seconds, i.e. retrySec is set to 30. When retrySeq is equal to 6, retries are 60 seconds apart.

8.2 Procedures at Transit Nodes

At transit node B, a label request message for FEC Z is received on MPLS signaling link 84 and forwarded by the L2 processor 50 to the responsible LMS 64. The LMS 64 requests next hop information from MPLS Routing 70 which, in turn, retrieves the next hop router ID for FEC Z from IP Routing 68, stores the next hop router ID in the RWT 120, selects a downstream LDP Session to the next hop LDP peer router, node C, and supplies this data to the LMS 64, as discussed previously. The LMS 64 then requests the label manager 62 to reserve a VPI/VCI label from within the negotiated label range (determined when the LDP Session with the upstream node A was established). This label is forwarded upstream to node A when the label mapping message is sent thereto Then, if necessary, the LMS 64 which received the upstream label request message will signal another instantiation of the LMS (on a different L3 processor 54) responsible for the downstream LDP Session in order to progress the Label Request message to node C.

When a label mapping message is received from the downstream signalling link, the LMS 64 signals the call processor 72 to establish a cross-connect between the label, i.e., VPI/VCI, associated with upstream node A and the label, i.e., VPI/VCI, associated with the downstream node C to thereby establish downstream data flow. On the transit node this results in an ATM style cross-connect, as discussed above. In addition, the LMS 64 responsible for the upstream LDP Session to node A forwards a label mapping message to it with the label previously reserved by the label manager 62.

Note that for source-routed SLSPs it may not be necessary for the transit node B to obtain next hop information from IP Routing 70. This is, however, a preferred feature which enables the transit node to confirm through its internal routing tables that the next hop provided in the source route list is accurate (e.g., by checking whether the next hop is listed under the requested IP destination address or prefix). If the explicitly routed next hop cannot be confirmed, then an error can be declared.

8.3 Procedures on Egress Node

On the egress node C, a label request message is received on the upstream signalling link with node B and forwarded by the L2 processor 50 to the responsible LMS 64. The LMS 64 requests next hop information from MPLS Routing 70 which, in turn, requests next hop information from IP Routing 68. In this case, however, one of the following circumstances arises: (1) the next hop router ID returned by IP Routing 68 is the current node; or (2) the next hop is found, but no LDP Session exists to the next hop (i.e., the edge of the MPLS domain is reached). In either of these cases, MPLS Routing 70 informs the LMS 64 that the SLSP for FEC Z must egress at this node, whereby the LMS 64 sends a label mapping message to the upstream node B as previously described but does not (and cannot) progress the label request message for FEC Z forward. In this case, MPLS Routing 70 adds an entry 126 in the RWT 120, as previously discussed, but also adds the newly created RWT entry 126 to the LET 130.

In this case, the LMS 64 instructs the call processor 72 to establish an SI configured for IP forwarding. This SI has an ATM endpoint (i.e., VPI/VCI) equal to the VPI/VCI used as the MPLS label between nodes B and C for the SLSP.

9. Switching/Routing Activity

Having described the set up of an SLSP for FEC Z, the manner in which IP packets associated with FEC Z are processed is now briefly described. At the ingress node A the IP packets arrive at port 14A1 in the form of plural ATM cells which the IP forwarder 22A reassembles into constituent IP packets. Once the destination IP address of the received packet is known, the IP forwarder 22A examines its forwarding table 30 for the "closest" entry. This will be the entry for FEC Z that was downloaded by IP Routing 68 in connection with the establishment of the SLSP for FEC Z. Thus, the forwarding table 30 provides the egress interface index 76, comprising the identity or address of the egress line card 12B, egress port 14B1 and egress SI number. The egress interface index is attached to the packet. The ingress IP forwarder 22A also selects a TI 18 to transport the packet over the switching fabric 20 to the egress IP forwarder 22B, based in part on the COS field encapsulated in the packet. The packet is then re-segment for transport across the switching fabric 20 on the selected TI 18 and received by the egress IP forwarder 22B. The egress IP forwarder 22B, in turn, extracts the egress SI and COS information attached to the packet and modifies it to match the encapsulation indicated by the egress interface index (i.e., egress SI). This includes attaching the VPI/VCI label to the packet. The packet is subsequently segmented into constituent ATM cells and transmitted out of the egress port 14B1 with the VPI/VCI values indicated by the egress SI.

On the transit node B, the ATM cells corresponding to the IP packets are received by an ingress port. The CAM 15 returns an ATM egress connection index, whereby the cells are processed as ATM cells. The ingress line card 12A also attaches internal addressing information retrieved from the CAM 15A to each cell, thereby enabling the cells to be routed to the egress line card which replaces the VPI/VCI value of the cells. The egress line card then transmits the cell using the new VPI/VCI value. Note that in this case the IP forwarding modules 22 were not involved in the switching activity and there was no need to re-assemble and re-segment the IP packet, or perform the IP routing lookup.

On the egress node C, the ATM cells corresponding to the IP packets are received by an ingress port and processed in accordance with the SI configured for the VPI/VCI carried by the cells. This SI is configured such that the cells are sent to the IP forwarding module 22A for re-assembly into the higher-layer IP packets and thereafter processed as regular IP packets.

10. Network Topology Changes

10.1 New LDP Session

Figure 11:
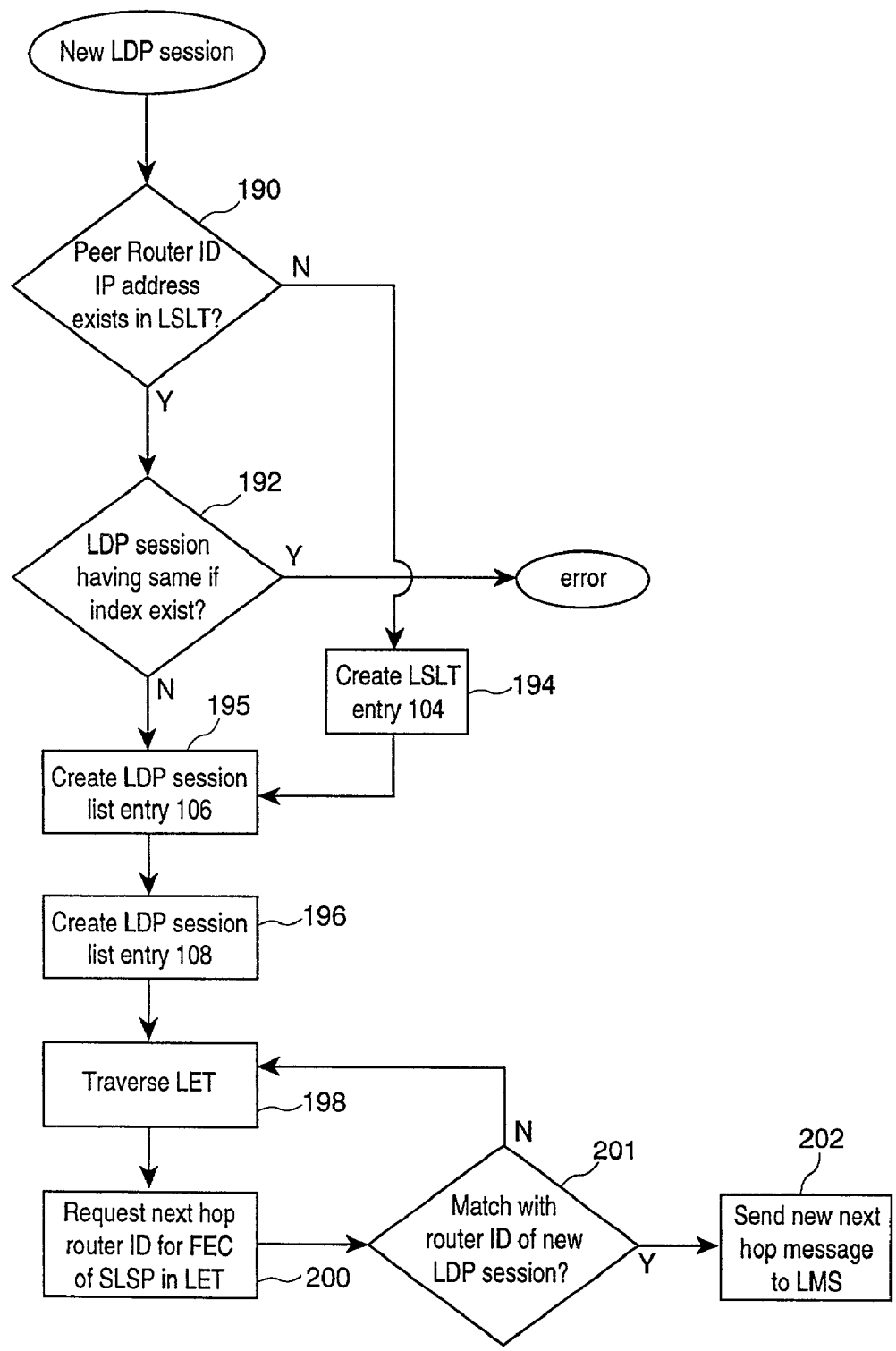
FIG. 11 is a logic flow chart showing the steps executed by the node in the event a new SLSP signalling link is established.

When a new LDP Session is established on node 10, the LMS 64 signals MPLS Routing 70 about this event and informs it about the interface index for the new LDP Session. The signal arises whether the node is the initiator of the new LDP Session or the respondent. Referring additionally to the flow chart of FIG. 11, at step 190 MPLS Routing searches for the peer router ID IP address in the LSLT 100. If an LSLT entry 194 for this router is found, then at step 192 MPLS Routing 70 examines the corresponding LDP Session list 106 to ensure that no entries 108 exist for an LDP Session having the same interface index as the new LDP session. If no such entry is found, a new entry 108 is created at step 195. If such an entry is found, an error is returned. If no LSLT entry 104 is found which matches the peer router ID for the newly configured LDP Session, then at step 194 MPLS Routing creates and inserts a new LSLT entry 104, following which the LDP session list entry 106 is created at step 195.

At step 196, MPLS Routing 70 traverses the LET 130. For each RWT entry 126 belonging to the LET, the corresponding FEC is determined from hash table 122, and at step 200 the next hop router ID for that FEC is requested from IP Routing 68. At step 201 the next hop router ID is compared against the peer router ID of the newly configured LDP Session. If no match is found, control returns to step 198, and if a match is found, control passes to step 202. At step 202, MPLS Routing 70 instructs the LMS 64 to send a label request message to the newly reachable peer router for the identified FEC.

10.2 Signaling Link Failure

When an LDP Session fails on a node it stops forwarding all SLSPs using the associated VPI/VCI range (stored in the label manager 62) and removes the crossconnects from the node. The node also sends a label withdraw message to the upstream peer for each SLSP associated with the failed LDP Session. For instance, if the MPLS link 84BC (FIG. 7) fails, node B sends a label withdraw regarding FEC Z to the ingress node A. When the label withdraw message is received at the ingress node A, it stops using the path (IP hop-by-hop forwarding is used instead) and immediately re-initiates the steps described previously to re-establish a path for FEC Z. If this does not succeed, then the SLSP for FEC Z is placed on the RTL 116 following which the retry procedures as previously described are effected.

Furthermore, when an LDP Session becomes inoperative in the ingress node A for whatever reason, the LMS 64 informs MPLS Routing 70. As part of this call, the LMS 64 provides MPLS Routing 70 with the peer router ID IP address. MPLS Routing 70 then searches for the peer IP address in the router ID field 104a of the LSLT 100. If there is no entry for the peer IP address, an error is returned. If there is an entry 104a for the peer IP address, the corresponding session list 106 is searched for the failed LDP Session. If there is a matching LDP Session entry 108, it is removed from the session list 106.

The *fit_list entry pointer 108b of the removed session list entry 106 points to the list of all FIT entries 112 representing all ingress SLSPs using the failed LDP Session. For each of these entries, MPLS Routing 70 immediately tries to reestablish the ingress SLSP as described above to see if there is an alternate LDP Session that may be used to set up the ingress SLSP. If the retry is unsuccessful, the ingress SLSP goes on the RTL 116 and the retry procedures outline above are followed.

10.3 IP Routing Changes

Over the course of time, IP Routing 68 may discover a new next hop for FEC Z. For example, in the reference network IP Routing on node B may discover that the next hop for FEC Z should be node D (not shown). Upon such a discovery, IP Routing 68 on node B informs MPLS Routing 70 of the new next hop router ID for FEC Z. MPLS Routing 70 uses the following process to re-route the SLSP for FEC Z: First, it searches for a RWT entry 122 matching the IP prefix address, e.g., FEC Z, which has changed in the IP Routing table 75. In the event no entry 122 is found MPLS Routing returns otherwise it continues and next searches for an LSLT entry 104 that matches the router ID of the new next hop D. If there is an LSLT entry 104 and hence LDP Session the new router D, MPLS Routing requests the LMS 64 to progress each transit SLSP in the RWT list 124 pointed to by the matching RWT entry 122 using the LDP Session to router D. Thus transit SLSPs are re-routed to the new next hop router D. However, if there is no LSLT entry 102 for the router ID of the new next hop and hence no LDP Session therefor, then MPLS Routing 70 places each transit SLSP in the RWT list 124 corresponding to the old-hop router on the LET 130 and informs the LMS 64 that it should consider such SLSPs as egress SLPs. The LMS 64, in turn, instructs the call processor 72 to set up egress SIs for the egress SLSPs.

MPLS Routing 70 also searches for a FIT entry 112 which matches the affected FEC. If there is a FIT entry 112 that matches the FEC and the ingress_setup flag of the fec-status field 112f is non zero (i.e., the path is set up), MPLS Routing 70 requests that the LMS 64 close the ingress SLSP by sending a label release message to the downstream routers. MPLS Routing 70 then searches for an LSLT entry 104a that matches the router ID IP address for the new next hop. If there is such an LSLT entry, then an LDP Session is selected from the corresponding LDP session list 106, and the procedures for establishing an ingress SLSP are followed as described above.

10.4 Physical Link Failure

When a physical link between two nodes fail, then signaling links 82 and 84 (see FIG. 7) for both MPLS signaling and IP routing fail. In the present embodiment, IP Routing 68 realizes that the link is down and updates its routing table 75 before the LMS 64 realizes that any LDP Sessions thereover are down. This is accomplished by suitably setting "time out" periods for LDP Sessions and signaling sessions in IP Routing such that interface failures are reflected much quicker into IP Routing 68 than MPLS Routing 70. Accordingly, IP Routing 68 informs MPLS Routing 70 about a new next hop router ID for affected SLSPs and as previously described MPLS Routing 70 will reroute these SLSP paths from the current node, using the new next hop router identified by IP Routing 68. This is more efficient than tearing down the affected SLSPs back to ingress node and resignaling them as would have occurred if MPLS Routing 70 realizes the signaling link is down.

The foregoing embodiment has been described with a certain degree of particularity for the purposes of description. Those skilled in the art will understand that numerous variations and modifications may be made to the embodiments disclosed herein without departing from the spirit and scope of the invention.

We claim:

1. A method of transmitting packets received from a connectionless network wherein each packet includes a destination network address, the method including: providing a forwarding table wherein each network address is associated with a single interface index which dictates an output port and a connection over which corresponding packets should be transported; forwarding a connectionless packet to an output port based on an interface index obtained from the forwarding table and transmitting the connectionless packet over the corresponding connection, maintaining a routing table for routing connectionless packets over a connection-oriented network, said routing table associating each network address with one or more interface indexes, associating each interface index with an application, one application being connectionless routing and one application being label switching; and downloading interface indexes from said routing table to corresponding entries in said forwarding table such that the label switching application has a higher priority than the connectionless routing application.

2. A method of transmitting packets including: receiving (a) connection-oriented packets having a label associated therewith, said label being a connection identifier, and (b) connectionless packets carrying a network address and having no label associated therewith; providing a forwarding table wherein each network address is associated with a single interface index which dictates an output port and a connection over which corresponding connectionless packets should be transported, providing a switching table for switching ingress labels into egress labels; forwarding a connectionless packet to an output port based on an interface index obtained from the forwarding table; forwarding a connection-oriented packet to an output port based on said switching table; transmitting connection-oriented and connectionless packets over the corresponding connections; maintaining a routing table for routing connectionless packets over a connection-oriented network, said routing table associating each network address with one or more interface indexes; associating each interface index with an application, one application being connectionless routing and one application being label switching, and downloading interface indexes from said routing table to corresponding entries in said forwarding table such that the label switching application has a higher priority than the connectionless routing application.

3. A network node, comprising: a plurality of input and output ports operative to receive and transmit packets carrying a connection identifier for transport over a connection-oriented network; switching logic for switching said connection-oriented packets from one of said input ports to one of said output ports based on one of said connection identifiers; segmentation and re-assembly logic for enabling said ports to assemble connectionless packets from the payloads of one or more connection-oriented packets on ingress and to segment each such connectionless packet into one or more connection-oriented packets on egress, each said message packet carrying a network address for transport over a connectionless network; forwarding logic for forwarding connectionless packets from one of said input ports to one of said output ports, said forwarding logic including a forwarding table which associates a network address or a group of network addresses with a single interface index, said interface index indicating the identity of one of said output ports and enabling a connection identifier to be specified for segmentation of the connectionless packet at the indicated output port; routing logic for forwarding a connectionless packet to a next-hop based on the network address carried by the packet, said logic including a routing table which associates a network address or group thereof with at least one interface index, said logic being enabled to download an interface index for a given network address or group thereof from said routing table to the same network address entry in said forwarding table time, and logic for setting up a label switched path wherein a connectionless packet is associated with a connection identifier which functions as a label so that transit nodes in the label switched path can switch the connection-orientated packets constituting connectionless packets based on the connection identifier without re-assembling the connectionless packets, said logic associating the label switched path with an interface index; wherein said interface indexes are associated with a priority hierarchy in which interface indexes associated with label switched paths have a higher priority than interface indexes associated with connectionless routing, and wherein said routing logic does not overwrite a forwarding table entry having an interface index associated with a label switched path with an interface index associated with connectionless routing.

4. A method of operating a communications network having a plurality of interconnected nodes wherein connectionless packets are forwarded over a connection-oriented infrastructure within a connectionless network, and wherein said communications network includes a label switched domain, the method comprising:

examining incoming connectionless packets at an ingress node to said label switched domain to identify connectionless destination addresses therefor;

establishing label switched paths for forwarding said connectionless packets from egress ports of the ingress node toward destination addresses in said label-switched domain;

establishing label distribution protocol sessions to manage said label switched paths;

maintaining a database to keep track of said label distribution protocol sessions;

maintaining a forwarding table to associate interface indices with corresponding network addresses, wherein said interface indices determine an egress port associated with corresponding destination addresses;

attaching an interface index to an incoming packet based on its destination address; and forwarding said incoming packet to the egress port determined by its associated interface index.

5. The method of claim 4, wherein once the destination address for an incoming packet has been determined, the forwarding table is examined to identify the closest entry to said destination address, and the interface index associated with said closest entry is assigned to the packet.

6. The method of claim 5, wherein said closest entry is associated with a forward equivalency class for the incoming packet.

7. The method of claim 5, wherein a label switched path is established for each forward equivalency class.

8. The method of claim 7, wherein signalling links are established between nodes forming part of said label switched domain, and a label request message for a forward equivalency class destination is transmitted over a said signalling link to a downstream node.

9. The method of claim 8, wherein the downstream nodes request next hop routing information for the forward equivalency class destination from a label switched routing table at the downstream node.

10. The method of claim 4, wherein in the event of a label distribution session protocol failure at a particular node, said particular node sends a label withdraw message to an upstream node for each label switched path associated with the label distribution protocol session.

11. The method of claim 4, wherein connection-oriented cells arriving at said label switched domain are re-assembled into said connectionless packets at the ingress node to determine the connectionless destination address.

12. The method of claim 8, wherein each node in the label switched domain includes a label management system task receiving signalling messages from other nodes in the label switched domain.

13. The method of claim 12, wherein the label management system task runs a state machine for each label switched path.

* * * * *